United States Patent
Yu et al.

(10) Patent No.: US 10,796,134 B2
(45) Date of Patent: *Oct. 6, 2020

(54) LONG-TAIL LARGE SCALE FACE RECOGNITION BY NON-LINEAR FEATURE LEVEL DOMAIN ADAPTATION

(71) Applicant: NEC Laboratories America, Inc., Princeton, NJ (US)

(72) Inventors: Xiang Yu, Mountain View, CA (US); Xi Yin, Sunnyvale, CA (US); Kihyuk Sohn, Fremont, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 127 days.

This patent is subject to a terminal disclaimer.

(21) Appl. No.: 16/145,257

(22) Filed: Sep. 28, 2018

(65) Prior Publication Data

US 2019/0095704 A1 Mar. 28, 2019

Related U.S. Application Data

(60) Provisional application No. 62/564,537, filed on Sep. 28, 2017, provisional application No. 62/585,579, filed on Nov. 14, 2017.

(51) Int. Cl.
*G06K 9/00* (2006.01)
*G06N 3/08* (2006.01)
(Continued)

(52) U.S. Cl.
CPC ..... *G06K 9/00288* (2013.01); *G06K 9/00261* (2013.01); *G06K 9/00268* (2013.01);
(Continued)

(58) Field of Classification Search
CPC ............ G06K 9/00288; G06K 9/6271; G06K 9/6247; G06K 9/6262; G06K 9/6256;
(Continued)

(56) References Cited

U.S. PATENT DOCUMENTS 5,012,522 A * 4/1991 Lambert .............. A61B 5/1176 382/118
5,450,504 A * 9/1995 Calia ........................ G06K 9/00 382/118

(Continued)

OTHER PUBLICATIONS

Huang, "Learning Deep Representation for Imbalanced Classification", IEEE Conference on Computer Vision and Pattern Recognition, Jun. 2016, pp. 5375-5384.
(Continued)

*Primary Examiner* — Juan A Torres
(74) *Attorney, Agent, or Firm* — Joseph Kolodka

(57) ABSTRACT

A computer-implemented method, system, and computer program product are provided for facial recognition. The method includes receiving, by a processor device, a plurality of images. The method also includes extracting, by the processor device with a feature extractor utilizing a convolutional neural network (CNN) with an enlarged intra-class variance of long-tail classes, feature vectors for each of the plurality of images. The method additionally includes generating, by the processor device with a feature generator, discriminative feature vectors for each of the feature vectors. The method further includes classifying, by the processor device utilizing a fully connected classifier, an identity from the discriminative feature vector. The method also includes control an operation of a processor-based machine to react in accordance with the identity.

20 Claims, 10 Drawing Sheets

(51) Int. Cl.
*G06K 9/62* (2006.01)
*G06Q 20/40* (2012.01)
*G06Q 30/02* (2012.01)
*G08B 13/196* (2006.01)
*G08B 15/00* (2006.01)
*H04N 7/18* (2006.01)

(52) U.S. Cl.
CPC ......... *G06K 9/6247* (2013.01); *G06K 9/6256* (2013.01); *G06K 9/6262* (2013.01); *G06K 9/6269* (2013.01); *G06K 9/6271* (2013.01); *G06N 3/08* (2013.01); *G06N 3/084* (2013.01); *G06Q 20/40145* (2013.01); *G06Q 30/0281* (2013.01); *G08B 13/196* (2013.01); *G08B 15/007* (2013.01); *H04N 7/183* (2013.01); *H04N 7/185* (2013.01)

(58) Field of Classification Search
CPC ............. G06K 9/6269; G06K 9/00268; G06K 9/00261; G08B 15/007; G08B 13/196; G06Q 30/0281; G06Q 20/40145; G06N 3/084; G06N 3/08; G06N 3/0454; H04N 7/185; H04N 7/183
USPC ......................................................... 382/118
See application file for complete search history.

(56) References Cited

U.S. PATENT DOCUMENTS

| | | | |
|---|---|---|---|
| 5,561,718 A * | 10/1996 | Trew | G06K 9/00221 382/118 |
| 5,625,704 A * | 4/1997 | Prasad | G06K 9/00221 382/118 |
| 5,982,912 A * | 11/1999 | Fukui | G06K 9/00221 382/115 |
| 6,128,398 A * | 10/2000 | Kuperstein | G06K 9/00288 382/118 |
| 2011/0311129 A1* | 12/2011 | Milanfar | G06K 9/00335 382/154 |
| 2013/0223726 A1* | 8/2013 | Jiang | G06K 9/6287 382/159 |
| 2015/0317511 A1* | 11/2015 | Li | G06K 9/00288 382/118 |

OTHER PUBLICATIONS

Zhang, "Loss for Deep Face Recognition with Long-tail", CVPR, Nov. 2016, pp. 1-10.

Hariharan, "Low-shot Visual Recognition by Shrinking and Hallucinating Features", 2017 International Conference on Computer Vision, Nov. 2017, pp. 3018-3027.

* cited by examiner

200

Train the feature extractor, the decoder, the feature filter, the fully connected classifier.
210

Utilize $\mathcal{L} = \alpha_{sfmx}\mathcal{L}_{sfmx} + \alpha_{recon}\mathcal{L}_{recon} + \alpha_{reg}\mathcal{L}_{reg}$
215

Reshape the decision boundaries..
220

Update the feature filter and the fully connected classifier using variance transferred features from regular to long-tail classes to enlarge the intra-class variance of long-tail classes while fixing the feature extractor and the decoder.
225

Utilize a regular batch sampled from hard index list h:$\{g^r, y^r\}$, a long-tail batch sampled from long-tail classes $\{g^t, y^t\}$, and a transferred batch by transferring the variances from the regular batch to the long-tail batch $\{\tilde{g}^t, y^t\}$.
227

Learn compact features.
230

Train the feature extractor, the decoder, and the feature filter using normal batches $\{x, y\}$ from regular and long-tail classes.
235

Utilize $\mathcal{L} = \alpha_{sfmx}\mathcal{L}_{sfmx} + \alpha_{recon}\mathcal{L}_{recon} + \alpha_{reg}\mathcal{L}_{reg}$
215

FIG. 2

LONG-TAIL LARGE SCALE FACE RECOGNITION BY NON-LINEAR FEATURE LEVEL DOMAIN ADAPTATION

BACKGROUND

Technical Field

The present invention relates to facial recognition and more particularly long-tail large scale facial recognition by non-linear feature level domain adaption.

Description of the Related Art

General deep learning-based methods treat all the training subjects equally. To alleviate the long-tail problem, the long-tailed subjects are usually removed from the training set, which reduces the number of subjects for training and leads to worse performance.

SUMMARY

According to an aspect of the present principles, a computer-implemented facial recognition method is provided. The method includes receiving, by a processor device, a plurality of images. The method also includes extracting, by the processor device with a feature extractor utilizing a convolutional neural network (CNN) with an enlarged intra-class variance of long-tail classes, feature vectors for each of the plurality of images. The method additionally includes generating, by the processor device with a feature generator, discriminative feature vectors for each of the feature vectors. The method further includes classifying, by the processor device utilizing a fully connected classifier, an identity from the discriminative feature vector. The method also includes control an operation of a processor-based machine to react in accordance with the identity.

According to another aspect of the present principles, a computer program product is provided for facial recognition. The computer program product comprising a non-transitory computer readable storage medium having program instructions. The program instructions executable by a computer to cause the computer to perform a method. The method includes receiving, by a processor device, a plurality of images. The method also includes extracting, by the processor device with a feature extractor utilizing a convolutional neural network (CNN) with an enlarged intra-class variance of long-tail classes, feature vectors for each of the plurality of images. The method additionally includes generating, by the processor device with a feature generator, discriminative feature vectors for each of the feature vectors. The method further includes classifying, by the processor device utilizing a fully connected classifier, an identity from the discriminative feature vector. The method also includes control an operation of a processor-based machine to react in accordance with the identity.

According to another aspect of the present principles, a facial recognition system is provided. The facial recognition system includes a camera. The facial recognition system includes a processing system having a processor device and memory receiving input from the camera. The processing system programmed to receive a plurality of images. The processing system is also programmed to extract, with a feature extractor utilizing a convolutional neural network (CNN) with an enlarged intra-class variance of long-tail classes, feature vectors from each of the plurality of images. The processing system is additionally programmed to generate, with a feature generator, discriminative feature vectors for each of the feature vectors. The processing system is further programmed to classify, with a fully connected classifier, an identity from the discriminative feature vectors. The processing system is also programmed to control an operation of a processor-based machine to react in accordance with the identity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a block/flow diagram illustrating a feature transfer learning method for facial recognition, in accordance with an embodiment of the present invention;

DETAILED DESCRIPTION OF PREFERRED EMBODIMENTS

Figure 1:
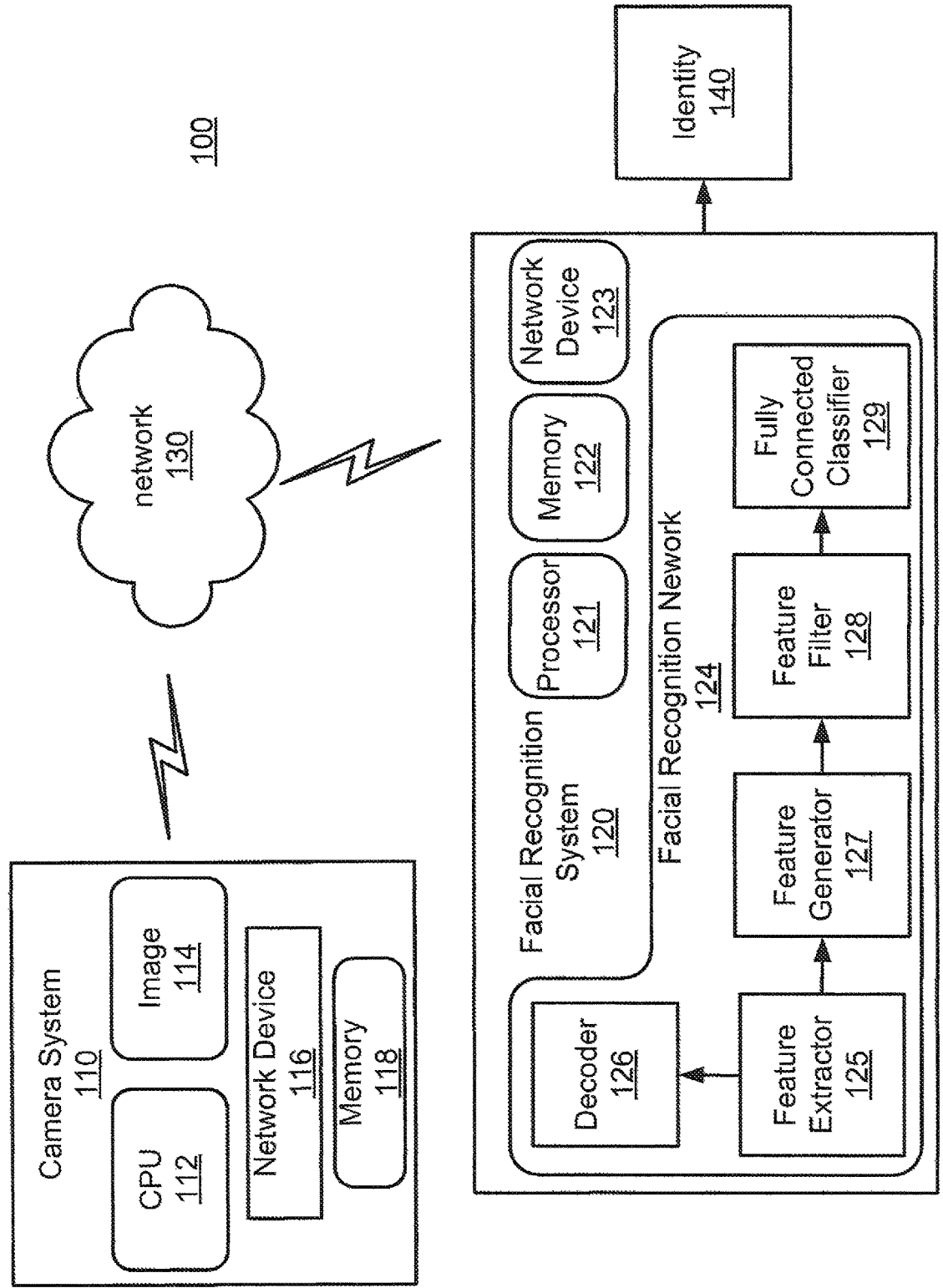
FIG. 1 is a block/flow diagram illustrating a high-level environment with facial recognition, in accordance with an embodiment of the present invention.

Facial recognition is one of the ongoing success stories of the deep learning era, yielding very high accuracies on traditional datasets. However, it remains undetermined how these results translate to practical applications, or how deep learning classifiers for fine-grained recognition needs to be trained to maximally exploit real-world data. While it has been established that recognition engines are data-hungry and keep improving with more volume, mechanisms to derive benefits from the vast diversity of real data are relatively unexplored. In particular, real-world data is long-tailed, with only a few samples available for most classes. In practice, effective handling of long-tail classes, also called tail classes, is also indispensable in surveillance applications where subjects may not cooperate during data collection.

There is evidence that classifiers that ignore this long-tail nature of data likely imbibe hidden biases. A simple solution is to simply ignore the long-tail classes, as common for traditional batch construction and weight update schemes. Besides a reduction in the volume of data, the inherently uneven sampling leads to biases in the weight norm distribution across head and tail classes. Sampling tail classes at a higher frequency addresses the latter, but still leads to biased decision boundaries due to insufficient intra-class variance in tail classes.

Strategies for training more effective classifiers for facial recognition by adapting the distribution of learned features from tail classes to mimic that of head (or regular) classes are provided. Long-tail classes are handled during training by augmenting their feature space using a center-based transfer. In particular, a Gaussian prior is assumed, whereby most of the variance of regular classes are captured by the top few components of a Principal Components Analysis (PCA) decomposition. By transferring the principal components from regular classes to long-tail classes, the variance of the long-tail classes is encouraged to mimic that of the regular classes. Restricting the transfer variance within the minimum inter-class distance limits the transfer error to be within the classifier error.

The feature transfer overcomes the issues of imbalanced and limited training data. However, directly using the augmented data for training is sub-optimal, since the transfer might further skew the class distributions. Thus, a training regimen that alternates between carefully designed choices to solve for the feature transfer (with the goal of obtaining a less biased decision boundary) and feature learning (with the goal of learning a more discriminative representation) is provided. Further, a novel metric regularization that jointly regularizes softmax feature space and weight templates is utilized, leading to empirical benefits such as reduced problems with vanishing gradients.

The facial recognition problem is geared towards at least two orders of magnitude more classes than general image classification problems, which leads to significant differences due to more compact decision boundaries and different nature of within-class variances. In particular, transferring semantic aspects based on relative positions in feature space can be valid for ImageNet categories that vary greatly in shape and appearance, but not for facial recognition. Rather, facial recognition can employ transferring the overall variance in feature distributions from regular to long-tail classes.

Moreover, the method can be applied to challenging low-shot or one-shot scenarios, where the method shows competitive results on a one-shot challenge without any tuning. Finally, the feature transfer is visualized through smooth interpolations, which demonstrate that a disentangled representation is learned that preserves identity while augmenting non-identity aspects of the feature space.

The present embodiments provide a facial recognition system that can include a center-based feature-level transfer algorithm to enrich the distribution of long-tailed classes, leading to diversity without sacrificing volume. The center-based feature-level transfer algorithm can also lead to an effective disentanglement of identity and non-identity feature representation. The center-based feature-level transfer algorithm can include a simple but effective metric regularization to enhance performances for both the method and baselines, which is also applicable to other recognition tasks. A two-stage alternating training scheme can be employed to achieve an unbiased classifier and to retain discriminative power of the feature representation despite augmentation. The center-based feature-level transfer algorithm can produce demonstrable benefits for facial recognition in both general and one-shot settings.

Referring now in detail to the figures in which like numerals represent the same or similar elements and initially to FIG. 1, a high-level environment 100 for facial recognition is illustratively depicted in accordance with one embodiment of the present invention. The environment 100 can include a camera system 110 and a facial recognition system 120. While a single camera system 110 is shown in FIG. 1 for the sakes of illustration and brevity, it is to be appreciated that multiple camera systems can be also used. The camera system 110 can include a CPU device 112, a network device 116, and a memory 118.

The memory 118 may include a Read Only Memory (ROM), random access memory (RAM), or any other type of memory useful for the present applications. The memory 118 can be employed to store an image, a frame from a video, or a video (hereinafter "image") 114. The CPU device 112 can process the image 114 for many purposes, e.g., to compress the image 114 for transmitting over the network device 116, reduce the image 114 to only include frames that include faces, etc. The camera system 110 can transmit the image 114 to a network 130 with the network device 116.

In one embodiment, the network device 116 can be equipped to communicate with a cellular network system. In this way, the camera system 110 can contact a control center with information related to the status of the camera system 110 and the property the system is monitoring. The network device 116 can include a WIFI or equivalent radio system, a local area network (LAN), hardwired system, etc. The network device 116 can provide the camera system 110 a communication channel with other camera systems or the facial recognition systems.

In the embodiment shown in FIG. 1, the elements thereof are interconnected by a network(s) 130. However, in other embodiments, other types of connections (e.g., wired, wireless, etc.) can also be used. The facial recognition system 120 connected to the network 130 can include a processor device 121, a memory 122, and a network device 123. The processor 121 and the memory 122 of the facial recognition system 120 can be configured to perform facial recognition based on images received from the camera system 110 by (e.g., the network device 123 of) the facial recognition system 120.

The facial recognition system 120 can include a facial recognition network 124 that includes a feature extractor 125 to extract facial features from the image 114. The features can be passed to a decoder 126 to decode the facial features. The facial features can also be passed to a feature generator 127 that can generate new transferred features from the facial features. In one embodiment, the feature generator 127 can include a center-based non-linear feature transfer. In another embodiment, the feature generator 127 can include a pair-wise non-center-based non-linear feature transfer. The transferred features can be passed to a feature filter 128 that can filter the transferred features into classifiable features. The classifiable features can be passed into a fully connected classifier 129 that can classify the features to generate an identity 140 from the image 114.

The facial recognition network 124 can be trained in two stages with an alternative bi-stage strategy. At stage 1, the feature extractor 124 is fixed and the feature transfer 126 is applied to generate new transferred features that are more diverse and likely to violate a decision boundary. The decision boundary being the border or the limit where a feature is classified into one category versus another category. In stage 2, the fully connected classifier 129 is fixed and all the other models are updated. As a result, the features that are originally on or across the boundary are pushed towards their center.

The norm of classifier weight (e.g., weight matrix of last fully connected layer) of regular classes, with many samples, is much larger than that of long-tail classes, with few samples, which causes the decision boundary to bias towards the long-tail class. This is mainly due to the fact that the weights of regular classes are more frequently updated than those of long-tail classes because the greater sample size.

Significant imbalance can be observed after weight norm regularization via data re-sampling. For example, if two classes are randomly picked, one from a regular class and the other from a long-tail class. The features of both classes can be visualized when the two classes are projected onto a 2D space with weight norm regularization. Although the weights of both classes are regularized to be similar, the low intra-class variance of the tail class is not fully resolved. This can cause the decision boundary to be biased, which impacts recognition performance.

Enlarging the intra-class variance for tail classes alleviates the impact of long-tail classes. In particular, a data augmentation approach at the feature-level is provided that can be used as extra positive examples for tail classes to enlarge the intra-class variance. The feature distribution augmented by these virtual positive examples helps rectify the classifier boundary, which in turn allows reshaping the feature representation.

The facial recognition network 124 focuses on recovering the missing samples of tail classes by transferring knowledge from regular classes to enlarge intra-class variance. At first glance, the goal of diversifying features of tail classes appears to contradict the general premise of deep learning frameworks, which is to learn compact and discriminative features. However, it is more advantageous to learn intra-class variance of tail classes for generalization, that is, adapting to unseen examples. To achieve this, the intra-class variance of tail classes at a lower layer is enlarged, while subsequent filtering layers learn a compact representation with the softmax loss.

The facial recognition network 124 can include several components, such as the feature extractor 125, the decoder 126, the feature generator 127 followed by the feature filter 128, and the fully connected classifier 129, as well as multiple training losses, such as image reconstruction loss, or classification loss. The feature extractor 125 can compute rich feature $g=Enc(x) \in \mathbb{R}^{320}$ of the image 114, e.g., $x \in \mathbb{R}^{100 \times 100}$, and reconstruct the image 114 with the decoder 126, e.g., $x'=Dec(g)=Dec(Enc(x)) \in \mathbb{R}^{100 \times 100}$. With Enc as the feature extractor 125, Dec as the decoder 126, x as the image 114 in the space $\mathbb{R}^{100 \times 100}$ with a size of 100 by 100, g being the features extracted from the image x in the space $\mathbb{R}^{320}$ with a feature dimension of 320, and x' being the reconstructed image. The feature dimension 320 can be empirically set considering the overall network complexity as well as the runtime. This pathway is trained with the following pixel-wise reconstruction loss e.g., $\mathcal{L}_{recon}$:

$$\mathcal{L}_{recon}=\|x'-x\|^2_2 \quad (1)$$

The reconstruction loss allows g to include diverse attributes besides identity, such as pose and expression that are to be transferred from regular classes to tail classes. The feature generator 127 transfers the variance computed from regular classes and generates a new feature $\tilde{g}=G(g) \in \mathbb{R}^{320}$ from tail classes, as described below. Then, the feature filter 128 can be applied to generate identity-related features $f=R(\tilde{g}) \in \mathbb{R}^{320}$ that can be fed to a fully connected layer in the fully connected classifier 129 with weight matrix $[w_j] \in \mathbb{R}^{N_c \times 320}$. Defining G as the feature generator 127, R as the feature filter 128, and $[w_j]$ the weight matrix in the space $\mathbb{R}^{N_c \times 320}$, where $N_c$ denotes the number of total subjects, this pathway optimizes the softmax loss, e.g., $\mathcal{L}_{sfmx}$:

$$\mathcal{L}_{sfmx} = -\log \frac{\exp(w_i^T f)}{\sum_j^{N_c} \exp(w_j^T f)} \quad (2)$$

where i is the ground truth label of f. $w_i^T$ and $w_j^T$ are the transposed matrices of $w_i$ and $w_j$.

The facial recognition network 124 can utilize the softmax loss. The softmax loss is scale-dependent, that is, the loss can be made arbitrarily small by scaling the norm of the weights $w_j$ or feature f. Typical solutions to prevent the problem are to either regularize the norm of weights or features, or to normalize the norm of weights or features simultaneously. However, these are too stringent since they penalize norms of individual weights and feature without considering their compatibility. Instead, the norm of the inner product of weights and the features can be directly regularized, e.g., $\mathcal{L}_{reg}$, as follows:

$$\mathcal{L}_{reg}=\|W^T f\|_2^2 \quad (3)$$

The $\mathcal{L}_{reg}$ term of regularization is named metric $L_2$ or m–$L_2$. The joint regularization of weights and features through the magnitude of their inner product works better in practice than individual regularization.

Finally, the overall training loss in the facial recognition network 124, e.g., $\mathcal{L}$, is formulated, with the regularization coefficients set to for example $\alpha_{sfmx}=\alpha_{recon}=1$, and $\alpha_{reg}=0.25$:

$$\mathcal{L}=\alpha_{sfmx}\mathcal{L}_{sfmx}+\alpha_{recon}\mathcal{L}_{recon}+\alpha_{reg}\mathcal{L}_{reg} \quad (4)$$

Rich features $g_{ik}$ from class i lies in Gaussian distribution with the class-specific mean $c_i$ and the covariance matrix $\Sigma_i$ can be employed. To transfer intra-class variance from regular to long-tail classes, the covariance matrices can be shared across all classes, $\Sigma_i=\Sigma$. The mean, or a class center, can be simply estimated as an arithmetic average of all features from the same class. The center representation for regular classes can be identity-specific while removing irrelevant factors of variation such as pose, expression or illumination. However, due to lack of training examples, the center estimate of long-tail classes may not be accurate and can be often biased towards certain identity-irrelevant factors, such as pose, which can be found dominant in practice. To improve the quality of center estimate for long-tail classes, examples with extreme pose variations can be discarded. Furthermore, features from both the original and horizontally flipped images can be averaged in the facial recognition network 124. With $\bar{g}_{ik} \in \mathbb{R}^{320}$ a rich feature extracted from the flipped image, the feature center can be estimated as follows:

$$c_i = \frac{1}{2|\Omega_i|} \sum_{k \in \Omega_i} (g_{ik} + \bar{g}_{ik}), \quad \Omega_i = \{j \mid \|p_{ik} - \bar{p}_{ik}\|_2 \leq \tau\} \quad (5)$$

where $p_{ik}$ and $\bar{p}_{ik}$ are the pose codes for $\bar{g}_{ik}$ and $g_{ik}$, respectively. $\Omega_i$ includes indices for examples with yaw angle less than a threshold $\tau$. In one example, a practical value for $\tau$ is 0.5 or 30 degree.

The variance estimated from the regular classes to long-tail classes can be transferred. Originally, feature samples of long-tail classes can be augmented by adding a random noise vector $\epsilon \sim \mathcal{N}(0, \Sigma)$. (Each of the element inside long-tail class is generated by adding the randomly generated noise on to the original feature.) However, the direction of noise vectors might be too random when sampled from the distribution and does not reflect the true factors of variation found in the regular classes. Instead, the intraclass variance evaluated from individual samples of regular classes can be transferred. To further remove identity-related component in the variance, filtering can be employed using PCA basis $Q \in \mathbb{R}^{320 \times 150}$ achieved from intra-class variances of all regular classes. With the PCA basis Q being in a space $\mathbb{R}^{320 \times 150}$ of 320 by 150. The 150 eigen vectors corresponding to the top 150 significant eigen value as preserving 95% energy can be taken. The center-based feature transfer is achieved using:

$$\tilde{g}_{ik} = c_i + QQ^T(g_{jk} - c_j) \quad (6)$$

where $g_{jk}$ and $c_j$ are a feature sample and center of a regular class j, $c_i$ is the feature center of a long-tail class i and $\tilde{g}_{ik}$ is the transferred feature for class i, with Q and $Q^T$ being the eigen vectors column stacked matrix and its transpose. Here, $\tilde{g}_{ik}$ preserves the same identity as $c_i$, with similar intra-class variance as $g_{jk}$. By sufficiently sampling $g_{jk}$ across different regular classes, an enriched distribution of the long-tail class i can be obtained, which includes of both the original observed features $g_{ik}$ and the transferred features $\tilde{g}_{ik}$.

Given a training set of regular and long-tail classes $\mathbb{D} = \{\mathbb{D}_{reg}, \mathbb{D}_{lt}\}$, all modules $\mathbb{M} = \{$the feature extractor 125, the decoder 126, the feature filter 128, the fully connected classifier 129$\}$ can first be trained using Eqn. 4 without any feature transfer. Then, a classifier until convergence with decision boundary reshaping using the feature transfer and a feature representation with boundary-corrected classifier can be alternatively trained. The overview of the two-stage alternating training process is illustrated in Algorithm 1.

| Algorithm 1: Alternating training scheme for feature transfer learning | |
|---|---|
| Stage 0: model pre-training | Function [C, Q, h] = UpdateStats( ) |
|   train $\mathbb{M}$ with dataset $\mathbb{D}$ using Eqn. 4 |   Init C = [ ], V = [ ], h = [ ] |
| Stage 1: decision boundary reshape |   for i = 1, . . . , $N_c$ do |
|   Fix the feature extractor 125 and |     $g_i = \text{Enc}(x_i)$, $\bar{g}_i = \text{Enc}(\bar{x}_i)$, |
|   the decoder 126, train the feature | |
|   filter 128 and the fully connected | |
|   classifier 129 |     $c_i = \frac{1}{2|\Omega_i|} \sum_{j \in \Omega_i} (g_{ij} + \bar{g}_{ij})$, |
|   [C, Q, h] = UpdateStats( ) | |
|   Init the feature transfer 127(C, Q) | |
|   for i = 1, . . . , $N_{iter}$ do |     C. append ($c_i$) |
|     train 1st batch from h: $\{x^r, y^r\}$ |     if i in $\mathbb{D}_{reg}$ then |
|     train 2nd batch from $\mathbb{D}_{lt}$: | |
|     $\{x^t, y^t\}$ $\tilde{g}^t = \text{Transfer}(x^r, y^r, y^t)$ |       $d = \frac{1}{m_i} \sum_j \|g_{ij} - c_i\|_2$, |
|     train 3rd batch: $\{\tilde{g}^t, y^t\}$ | |
| Stage 2: compact feature learning | |
|   Fix the fully connected classifier | |
|   129, train the feature extractor 125, |       for j = 1, . . . , $m_i$ do |
|   the decoder 126, and the feature |         V. Append ($g_{ij} - c_i$) |
|   filter 128 |         if $\|g_{ij} - c_i\|_2 > d$ then |
|   for i = 1, . . . , $N_{iter}$ do |           h. append ([i,j]) |
|     random samples from $\mathbb{D}$: $\{x, y\}$ |   Q = PCA(V), |
|     train $\{x, y\}$ using Eqn. 4 | Function $\tilde{g}^t = \text{Transfer}(x^r, y^r, y^t)$ |
| alternate stage 1 and 2 until |   $g^r = \text{Enc}(x^r)$, |
| convergence |   for k = 1, . . . , $N_b$ do |
| |     $c_i = C(y_k^r, :), c_j = C(y_k^t, :),$ |
| |     $\tilde{g}_k^t = c_i + QQ^T(g_k^r - c_j),$ |

Algorithm 1 is described in more detail for each training stage below. FIG. 2 shows a feature transfer learning method 200 for facial recognition, in accordance with an embodiment of the present invention. In stage 0, the feature extractor 125, the decoder 126, the feature filter 128, the fully connected classifier 129 are trained 210 with dataset $\mathbb{D}$ utilizing $\mathcal{L} = \alpha_{sfmx} \mathcal{L}_{sfmx} + \alpha_{recon} \mathcal{L}_{recon} + \alpha_{reg} \mathcal{L}_{reg}$ 215.

In stage 1, the decision boundaries can be reshaped 220. The decision boundaries can be reshaped by updating the feature filter 128 and the fully connected classifier 129 while fixing other modules using variance transferred features from regular to long-tail classes to enlarge the intra-class variance of long-tail classes 225, thus, reshape the decision boundary. First, the statistics can be updated including the feature centers C, PCA basis Q and an index list h of hard samples that are with the distance from the center more than the average distance for each regular class. The PCA basis Q can be achieved by decomposing the covariance matrix V computed with the samples from regular classes $\mathbb{D}_{reg}$. Three batches can be used for training in each iteration: a regular batch sampled from hard index list h: $\{g^r, y^r\}$, a long-tail batch sampled from long-tail classes $\{g^t, y^t\}$, and a transferred batch $\{\tilde{g}^t, y^t\}$ by transferring the variances from the regular batch to the long-tail batch 227.

In stage 2, compact features can be learned 230. The compact features can be learned by training the feature extractor 125, the decoder 126, and the feature filter 128 using normal batches $\{x, y\}$ from regular and long-tail classes 235 utilizing $\mathcal{L} = \alpha_{sfmx} \mathcal{L}_{sfmx} + \alpha_{recon} \mathcal{L}_{recon} + \alpha_{reg} \mathcal{L}_{reg}$ 215 without a transferred batch. The fully connected classifier 129 can be kept fixed since the fully connected classifier 129 is already trained well from the previous stage with the decision boundary being corrected from using feature transfer. The gradient directly back-propagates to the feature filter 128 and the feature extractor 125 for more compact representation, which decreases violation of class boundaries.

The decoder 126 in the facial recognition network 124 can be applied for feature visualization. It is known that the skip link between an encoder and decoder can improve visual quality. However, the facial recognition network 124 does not apply the skip link in order to encourage the feature g to incorporate the intra-class variance other than from the skip link.

Given a class with multiple samples, a feature center can be computed, on which the decoder 126 can be applied to generate a center face. The observation that the center can be mostly an identity-preserved frontal neutral face can be confirmed. It also applies to portraits and cartoon figures.

A transferred feature can be visualized using the decoder 126. Let $x_{1,2}$, $x'_{1,2}$, $g_{1,2}$, $c_{1,2}$ denote the input images, reconstructed images, encoded features and feature centers of two classes, respectively. Features can be transferred from class 1 to class 2 by: $g_{12} = c_2 + QQ^T(g_1 - c_1)$, and the decoded images can be visualized. Features can also be transferred from class 2 to class 1 and the decoded images can be visualized. The transferred images preserve the target class identity while retaining intra-class variance of the source in terms of pose, expression and lighting, which shows that the feature transfer is effective at enlarging the intra-class variance.

The interpolation between two facial representations can show the appearance transition from one to the other. Let $g_{1,2}$, $c_{1,2}$ denote the encoded features and the feature centers of two samples. A new representation as $g = g_1 + \alpha(g_2 - g_1)$ can be generated where identity and non-identity changes are mixed together. With $\alpha$ being an interpolation factor, a smooth transition can be generated of non-identity change as $g = c_1 + \alpha QQ^T(g_2 - c_2)$ and identity change as $g = g_1 + \alpha(c_2 - c_1)$. Traditional interpolation generates undesirable artifacts. However, the facial recognition network 124 can show smooth transitions, which verifies that the facial recognition network 124 is effective at disentangling identity and non-identity information.

The facial recognition network 124 includes a novel feature transfer approach for deep face recognition that exploits the long-tailed nature of training data. Generic approaches to deep face recognition encounter classifier bias problems due to imbalanced distribution of training data across identities. In particular, uniform sampling of both regular and long-tail classes leads to biased classifier weights, since the frequency of updating them for long-tail classes is much lower. The facial recognition network 124 enriches the feature space of the tail classes, while retaining identity. Utilizing the generated data, the alternating feature learning method rectifies the classifier and learns more compact feature representations. The $m-L_2$ regularization demonstrates consistent advantages which can boost performance across different recognition tasks. The disentangled nature of the augmented feature space can be visualized through smooth interpolations.

Table 1 illustrates an example of the network structures of the facial recognition network 124, which includes of the feature extractor 125, the decoder 126, the feature filter 128, and the fully connected classifier 129. The feature extractor 125 takes an input image x, for example $x \in \mathbb{R}^{100 \times 100 \times 3}$, and generates a feature vector g, for example $g \in \mathbb{R}^{320 \times 1}$. The decoder 126 takes g as an input and reconstructs the original input image as x', for example $x' \in \mathbb{R}^{100 \times 100 \times 3}$. The feature filter 128 takes the features g as input to generate a more discriminative representation f, for example $f \in \mathbb{R}^{320 \times 1}$. The fully connected classifier 129 takes f as input for classification with a linear layer, which is not shown in Table 1. Batch Normalization (BN) and Rectified Linear Units (ReLU) are applied after each convolution (Cv) and full convolution (FCv) layer except "Cv53".

Adaptive Moment Estimation (Adam) solver with batch size of 128 can be adopted. The learning rate can be set as $2e^{-4}$. The network converges after 20 to 30 epochs. Then, the alternative feature transfer learning scheme can be applied on top of the pre-trained model. The Adam solver with a batch size of 128 and a learning rate of $1e^{-5}$ can be employed. Stages 1 and 2 are alternated for every 5K iterations. It takes 10 to 15 alternations to converge.

In the facial recognition network 124, $m-L_2$ regularization jointly regularizes the classifier weights W and the feature representation f, considering their mutual compatibility:

$$\mathcal{L}_{reg} = \|W^T f\|_2 \qquad (7)$$

Further, Eqn. 9 shows that the joint regularization is upper-bounded by general $L_2$ regularization on both W and f. Eqn. 10 shows that the proposed $m-L_2$ regularization has the same asymptotic error as $L_2$ regularization.

$$\|W^T f\|_2^2 = \sum_j^{N_c} \|w_j^T f\|_2^2 = \qquad (8)$$

$$\sum_j^{N_c} \|w_j\|_2^2 \|f\|_2^2 |\cos\theta_j|^2 \leq \sum_j^{N_c} \|w_j\|_2^2 \|f\|_2^2 = \|W\|_2^2 \|f\|_2^2$$

$$\|W^T f\|_2 \leq \|W\|_2 \|f\|_2 \leq \|W\|_2^2 + \|f\|_2^2 \qquad (9)$$

$$N_c \|f\|_2^2 \geq \|W^T f\|_2^2 = \qquad (10)$$

$$\sum_j^{N_c} \|w_j\|_2^2 \|f\|_2^2 |\cos\theta_j|^2 = \|f\|_2^2 \sum_j^{N_c} \|w_j\|_2^2 |\cos\theta_j|^2 \geq \|f\|_2^2$$

TABLE 1

| | the feature extractor 125 | | | the decoder 126 | | | the feature filter 128 | |
|---|---|---|---|---|---|---|---|---|
| Layer | Filter | Output | Layer | Filter | Output | Layer | Filter | Output |
| | | | FC | | 6 × 6 × 320 | FC | | 6 × 6 × 320 |
| Cv11 | 3 × 3/1/1 | 100 × 100 × 32 | FCv52 | 3 × 3/1/1 | 6 × 6 × 160 | FCv52 | 3 × 3/1/1 | 6 × 6 × 160 |
| Cv12 | 3 × 3/1/1 | 100 × 100 × 64 | FCv51 | 3 × 3/1/1 | 6 × 6 × 256 | FCv51 | 3 × 3/1/1 | 6 × 6 × 256 |
| Cv21 | 3 × 3/2/1 | 50 × 50 × 64 | FCv43 | 3 × 3/2/1 | 12 × 12 × 256 | | | |
| Cv22 | 3 × 3/1/1 | 50 × 50 × 64 | FCv42 | 3 × 3/1/1 | 12 × 12 × 128 | | | |
| Cv23 | 3 × 3/1/1 | 50 × 50 × 128 | FCv41 | 3 × 3/1/1 | 12 × 12 × 192 | | | |
| Cv31 | 3 × 3/2/1 | 25 × 25 × 128 | FCv33 | 3 × 3/2/1 | 24 × 24 × 192 | | | |
| Cv32 | 3 × 3/1/1 | 25 × 25 × 96 | FCv32 | 3 × 3/1/1 | 24 × 24 × 96 | | | |
| Cv33 | 3 × 3/1/1 | 25 × 25 × 192 | FCv31 | 3 × 3/1/1 | 24 × 24 × 128 | | | |
| Cv41 | 3 × 3/2/0 | 12 × 12 × 192 | FCv23 | 3 × 3/2/1 | 48 × 48 × 128 | | | |
| Cv42 | 3 × 3/1/1 | 12 × 12 × 128 | FCv22 | 3 × 3/1/1 | 48 × 48 × 64 | | | |
| Cv43 | 3 × 3/1/1 | 12 × 12 × 256 | FCv21 | 3 × 3/1/0 | 50 × 50 × 64 | | | |
| Cv51 | 3 × 3/2/1 | 6 × 6 × 256 | FCv13 | 3 × 3/2/1 | 100 × 100 × 64 | | | |
| Cv52 | 3 × 3/1/1 | 6 × 6 × 160 | FCv12 | 3 × 3/1/1 | 100 × 100 × 32 | Cv52 | 3 × 3/1/1 | 6 × 6 × 160 |
| Cv53 | 3 × 3/1/1 | 6 × 6 × 320 | FCv11 | 3 × 3/1/1 | 100 × 100 × 3 | Cv53 | 3 × 3/1/1 | 6 × 6 × 320 |
| AvgP | 6 × 6/1/0 | 1 × 1 × 320 | | | | AvgP | 6 × 6/1/0 | 1 × 1 × 320 |

Neural network structures of different modules in the facial recognition network 124. "Cv" denotes "Convolution", "FCv" denotes "Full Convolution", and "AvgP" denotes "Average Pooling". The format for filter is filter size/stride/padding.

For initialization, the convolution layers are initialized with a uniform distribution $[-\sqrt{3/n}, \sqrt{3/n}]$, n is the number of entries of that layer's weight. The fully connected layers are initialized with a Gaussian distribution $\mathcal{N}(0, 1e^{-5})$. The training process is as Algorithm 1 in the main submission. For stage 0, Eqn. 4 is to pre-train an overall network. An There can be an assumption of $\|w_j\|=1$ in Eqn. 10, which is reasonable as one can always set up normalization for the weight. Even without such weight restriction, the weight norm actually varies around scale 1.

The first inequality in Eqn. 10 obviously holds as $N_c \geq \sum_{j=1}^{N_c} |\cos\theta_j|^2$. $N_c$ is the number of subjects. To prove the second inequality in Eqn. 10, we have $N_c \geq VC(f)$, $VC(f)$ is VC-dimension of feature f, $\theta_j$ is the angle between feature f and the $j^{th}$ weight vector $w_j$. The weight vectors are assumed optimally distributed.

In 2D space, $N_c \geq VC(\mathbb{R}^2)=3$. An arbitrary feature vector f, must lie in one of those three angular intervals spanned by $w_1$, $w_2$ and $w_3$. At least two of the three angles that f spans with those three weight vectors should be less than or equal to $\pi/3$. Further, $\Sigma_{j=1}^{N_c}|\cos \theta_j|^2$ is a convex function when $\theta \in [0, \pi/2)$. This constraint is strengthened to $[0, \pi/3]$ in 2D space with 3 classes. $\Sigma_{j=1}^{N_c}|\cos \theta_j|^2=1$ when $\theta=0$ or $\theta=\pi/3$. Still in 2D space, when $N_c$ increases from 3 to 4 or more, function $\Sigma_{j=1}^{N_c}|\cos \theta_j|^2$ maintains convex as $\theta \in [0,\pi/2)$, thus $\Sigma_{j=1}^{N_c}|\cos \theta_j|^2 \geq 1$ holds. When the feature dimension increases from 2D to 3D or higher dimension d, the VC-dimension becomes d+1. Then, function $\Sigma_{j=1}^{N_c}|\cos \theta_j|^2$ remains convex as $\theta \in [0, \pi/2)$. Thus, $\Sigma_{j=1}^{N_c}|\cos \theta_j|^2 \geq 1$ holds.

The differences between m-$L_2$ and general $L_2$ regularization can be empirically analyzed. Assume the training is close to optimal, which satisfies that $w_i^T f$ is non-zero while $w_j^T f$ are close to zero if i is the right class label. Independent regularization of f or W will still affect those j classes, which is over-regularization as no error occurs. In contrast, the m-$L_2$ regularization considers the overall regularization. As all other $w_j^T f$ close to zero, the regularization will mostly only emphasize on $w_j^T f$, which selectively penalizes on the right class for classification error. Nevertheless, $w_i$ or f are not explicitly pushed to be small, but the angle between $w_i$ and f can be pushed to be small, which squeezes the angular distribution more strictly. Such angular squeezing can be considered better-suited for the softmax setting where the feature distribution is angular.

The feature extractor 125 can extract features within one class and compute their feature center. The decoder 126 can be applied on the feature center to reconstruct an image-level center face. Further, one sample can be found that is closest to the center at the feature level. The feature centers correspond to frontal neutral faces, which are visually similar to the reconstructed images from the closest samples. In some cases, the feature center shows a smiling face, which happens when the majority of the images in this class are smiling.

The feature generator 127 can perform feature transfer in the feature space g. The transferred features can be visualized using the decoder 126. Let $x_{1,2}$, $x'_{1,2}$, $g_{1,2}$, $c_{1,2}$ denote the input images, reconstructed images, encoded features, and feature centers of two classes, respectively. Let Q denote the PCA basis of the intra-class variance. Features can be transferred from class 1 to class 2: $g_{12}=c_2+QQ^T(g_1-c_1)$, and the decoded images can be visualized as $x'_{12}$. Features can also be transferred from class 2 to class 1: $g_{21}=c_1+QQ^T(g_2-c_2)$, and the decoded images can be visualized as $x'_{21}$.

The feature transfer can succeed in transferring the intra-class variance of the source class to the center of the target class. The visualizations of the transferred features consistently preserve the target class identity by incorporating the source image attributes, e.g., pose, expression, lighting condition, hat and so on, which shows that our feature transfer is effective at enlarging the intra-class variance.

In the feature transfer framework, PCA can be employed to capture the intra-class variance. Here, what is being captured can be visualized in each basis. Specifically, one basis is added to the feature center to generate a new feature representation: $g_i=c_i+Q(:,k) \cdot 0.1$, where $c_i$ is the center of class i, $Q(:,k)$ is the kth PCA basis, and 0.1 is the mean absolute coefficient of all images when projecting to the top 10 basis.

It is clear that each PCA basis consistently captures a mixture of pose, expression, illumination variations. A multitude of basis can be added, for example, adding the 1st basis can improve the image quality with good lighting condition; adding the 6th basis can turn the face to left and makes it smile; adding the 7th basis can turn the face downward slightly and opens the mouth, etc. It is critical that the PCA basis captures the various intra-class variations so that the feature transfer is semantically meaningful. This visualization supports that the reconstruction task in our baseline framework encourages the feature space g to capture these variations.

The interpolation between two face representations helps to understand the disentanglement of the identity feature and the nonidentity feature. This visualization of interpolation is widely used in GAN-based frameworks. However, previous works visualize this transition with a mixed change of identity and non-identity variations. The facial recognition network 124 models the feature space as a linear combination of feature center and its intra-class variance. Therefore, the facial recognition network 124 can separate the visualization into two parts. Let $g_{1,2}$, $c_{1,2}$ denote the encoded features and the feature centers of two samples from different classes respectively. Previous works generate a new representation as $g=g_1+\alpha(g_2-g_1)$. The facial recognition network 124 can generate a smooth transition of non-identity change as $g=c_1+\alpha QQ^T(g_2-c_2)$ which is the same as the feature transfer when $\alpha=1$. On the other hand, the facial recognition network 124 can also generate a smooth transition of identity change as $g=g_1+\alpha(c_2-c_1)$. $\alpha$ can vary from 0.1 to 1 to visualize the transition results.

Figure 3:
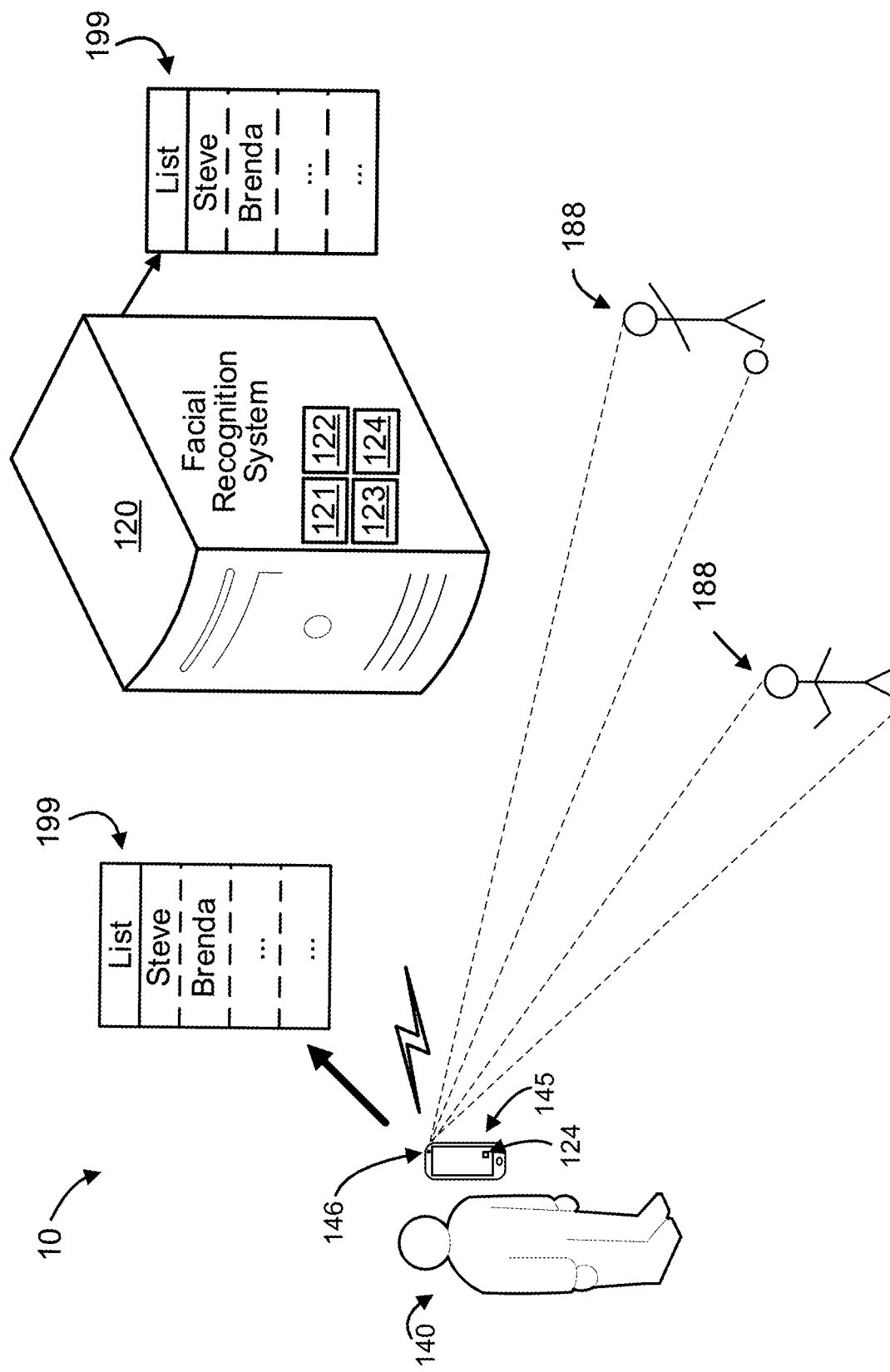
FIG. 3 is a block diagram illustrating an exemplary system for a mobile device with facial recognition, in accordance with an embodiment of the present invention.

FIG. 3 shows an exemplary system 10 for facial recognition with a mobile device 145, in accordance with an embodiment of the present invention.

The system 10 includes a mobile device 145. The mobile device 145 includes a camera system 146. While a single camera system 146 is shown in FIG. 3 for the sake of illustration and brevity, it is to be appreciated that multiple camera systems can be also be included in the mobile device 145.

In the embodiment of FIG. 3, the mobile device 145 can be held by a user 140. In one embodiment, the mobile device 145 can be a smart phone. In another embodiment, the mobile device 145 can be a camera e.g., a body camera, a video camera, or a still picture camera. The mobile device 145 can include a wireless communication system having its own antenna(s). In one embodiment, the mobile device 145 can be configured to perform facial recognition with the facial recognition network 124. In another embodiment, the mobile device 145 can connect to a facial recognition system 120 configured to perform the facial recognition. The facial recognition system 120 can be, e.g., a server, a main-frame, a network of servers, a cloud, etc. The facial recognition can involve recognizing a person 188 using facial recognition. The facial recognition can further involve performing one or more actions (e.g., in response to particular face recognition results). The facial recognition system 120 can be located remote from, or proximate to, the camera system 110. The facial recognition system 120 can include, e.g., a processor 121, a memory 122, a network device 123, and facial recognition network 124. The processor 121 and the memory 122 of the facial recognition system 120 can be configured to utilize the facial recognition network 124 to perform facial recognition based on images received from the mobile device 145 by (e.g., the network device 123 of) the facial recognition system 120. In this way, a list 199 of recognized persons can be provided for any of a myriad of possible application uses relating to facial recognition. Such application uses can involve one or more actions performed responsive to the list, as readily appreciated by one of ordinary skill in the art. The actions can include e.g., locking the mobile device, tagging the video with the identity and uploading the video to social media, tagging the video with the identity and sending the video to a user, tagging the video with the identity and forwarding the video to authorities responsive to a security alert to the public.

Figure 4:
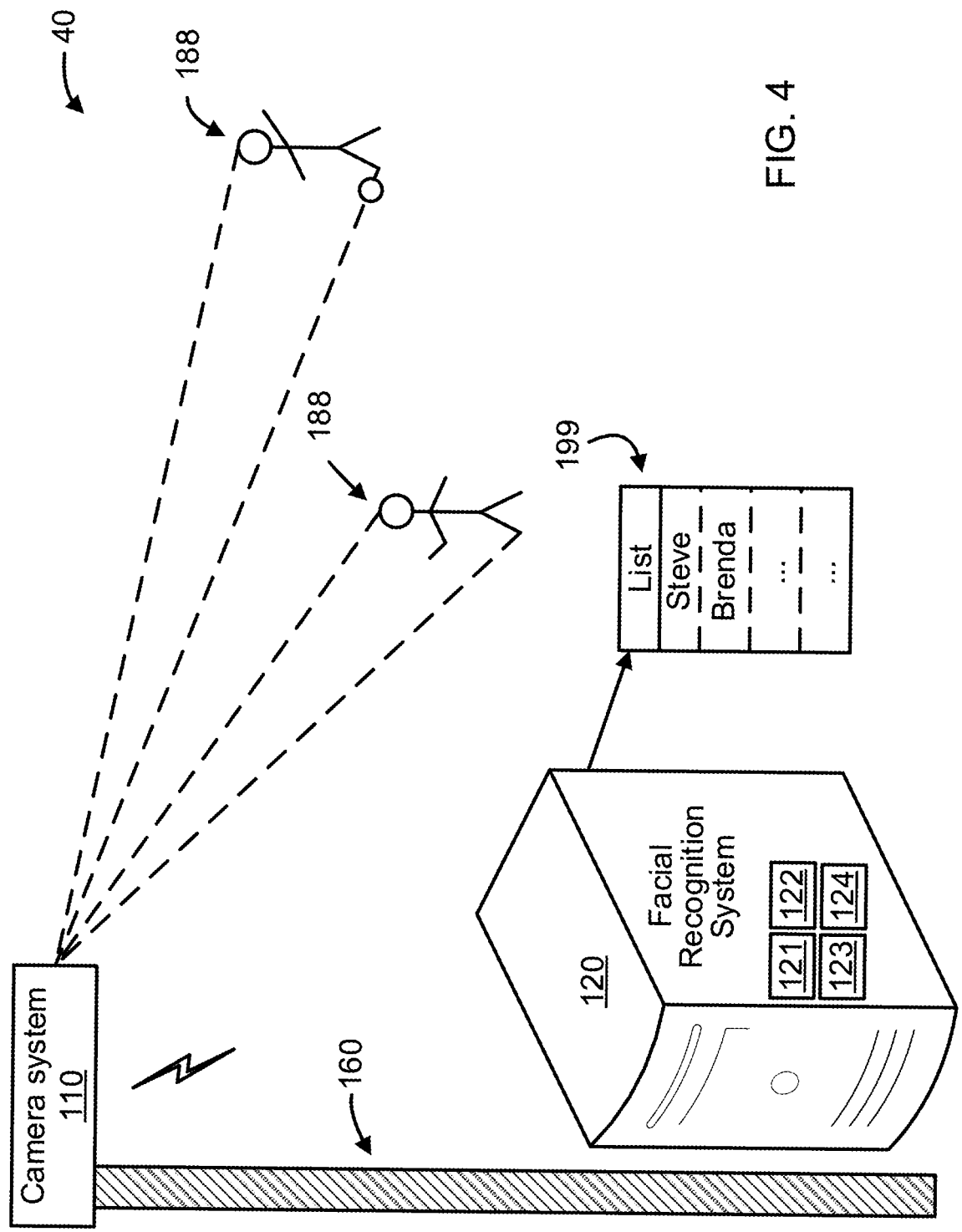
FIG. 4 is a block diagram illustrating an exemplary system for a surveillance system with facial recognition, in accordance with an embodiment of the present invention.

FIG. 4 shows an exemplary system for a surveillance system 40 with facial recognition, in accordance with an embodiment of the present invention.

The system 40 includes a camera system 410. While the single camera system 110 is shown in FIG. 4 for the sakes of illustration and brevity, it is to be appreciated that multiple camera systems can be also used.

In the embodiment of FIG. 4, the camera system 110 is mounted on a mounting entity 160. For the sake of illustration, the mounting entity 160 is a pole. While a pole 160 is shown (as a mounting entity) for the sake of illustration, any other mounting entity can be used, as readily appreciated by one of ordinary skill in the art given the teachings of the present invention provided herein. For example, the camera system 110 can be mounted in or on any of the following: a building, a tree, on a drone and so forth. The preceding examples are merely illustrative.

The camera system 110 can be a wireless camera system having its own antenna(s) or can use one or more antennas included on the pole 160 (or other mounting entity (e.g., building, drone, etc.) to which the camera system 110 is mounted or proximate).

The system 40 further includes the facial recognition system 120 configured to perform facial recognition of the person 188. The facial recognition system 120 can be, e.g., a server, a main-frame, a network of servers, a cloud, etc. Such facial recognition can be with respect to a secured object such as, for example, a facility. The facility can be a secured facility or a non-secured facility. In one embodiment, the facility can be a secured facility implemented as an airport. Of course, other facilities (e.g., mass transit hub, sports complex, etc.) can also be monitored with facial recognition in accordance with the present invention. The facial recognition can involve detecting the presence of the person 188. The facial recognition system 120 can be located remote from, or proximate to, the camera system 110. The facial recognition system 120 can include a processor 121, a memory 122, a network device 123, and a facial recognition network 124. The processor 121 and the memory 122 of the facial recognition system 120 can be configured to perform facial recognition on the person 188 based on images received from the camera system 110 by (e.g., the network device 123 of) the facial recognition system 120 to identify 130 the person 188. In this way, a list 199 of recognized users can be provided for any of a myriad of possible application relating to the users. Such application uses can involve one or more actions performed responsive to the list, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where facial recognition can prove useful such as mass transit hubs, border crossings, subways, transportation hubs, airports, ship ports, sports facilities, and so forth. It is to be appreciated that the preceding environments are merely illustrative and, thus, other environments can also be used, while maintaining the spirit of the present invention.

Figure 5:
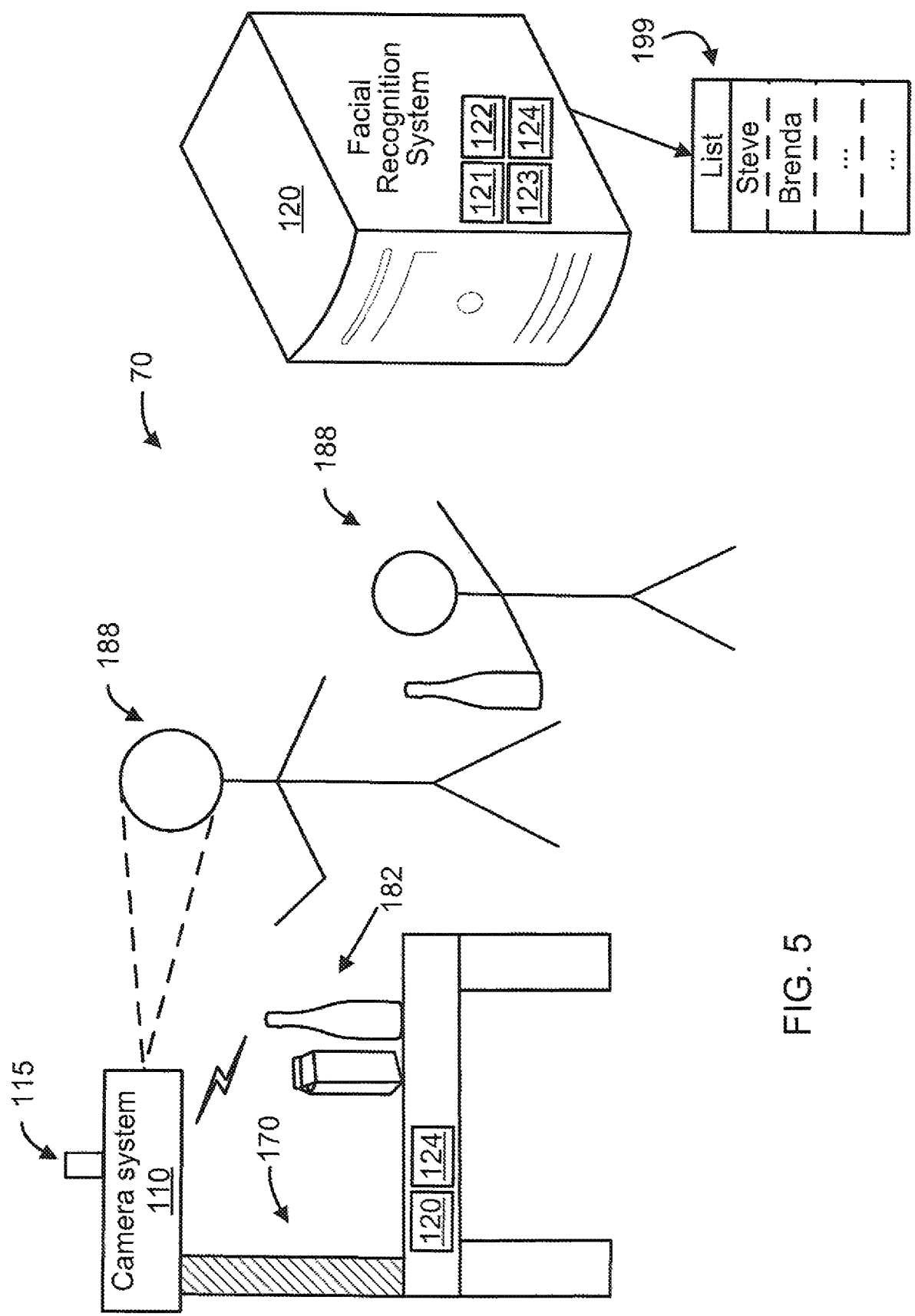
FIG. 5 is a block diagram illustrating an exemplary system for a point of sale system with facial recognition, in accordance with an embodiment of the present invention.

FIG. 5 shows an exemplary system 70 for a point of sale system 170 with facial recognition, in accordance with an embodiment of the present invention.

The system 70 includes the camera system 110 and the point of sale system 170. While a single camera system 110 is shown in FIG. 5 for the sakes of illustration and brevity, it is to be appreciated that multiple camera systems can be also used, while maintaining the spirit of the present invention. The camera system 110 can be separate from the point of sale system 170 or integrated into the point of sale system 170.

In the embodiment of FIG. 5, the camera system 110 is mounted on point of sale system 170. While the point of sale system 170 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 110 can be mounted in or on any of the following: a pole, a wall, the ceiling above the point of sale system 170, and so forth. The preceding examples are merely illustrative.

The camera system 110 can be a wireless camera system having its own antenna(s) or can use one or more antennas included on the point of sale system 170 (or other mounting entity (e.g., building, wall, ceiling, etc.) to which the camera system 110 is mounted or proximate).

The point of sale system 170 can include the facial recognition system 120 or the facial recognition network 124. The camera system 100 or the point of sale system 170 can include an indicator 115. In one embodiment, the indicator can be a light or a multi-colored light. In one embodiment, the system 70 can include the facial recognition system 120 configured to perform facial recognition. The facial recognition system 120 can be, e.g., a server, a main-frame, a network of servers, a cloud, etc. The facial recognition system 120 can recognize the person 188 buying the items 182 using facial recognition. The point of sale system 170 can further involve performing one or more actions (e.g., in response to particular facial recognition results). The facial recognition system 120 can be located remote from, or proximate to, the camera system 110 and the point of sale system 170.

The facial recognition system 120 can include, e.g., the processor 121, the memory 122, the network device 123, and the facial recognition network 124. The processor 121 and the memory 122 of the facial recognition system 120 can be configured to perform the facial recognition based on images received from the camera system 110 or the point of sale system 170 by (e.g., the network device 123 of) the facial recognition system 120. In this way, a list 199 of recognized persons can be provided for any of a myriad of possible application uses relating to facial recognition. Such application uses can involve one or more actions performed responsive to the list, as readily appreciated by one of ordinary skill in the art. For example, logging a customer into the point of sale system the customer having to provide a card, code, or account number and greeting the customer on a display or by changing the indicator 115, logging an employee into the point of sale system without the employee having to provide a card, code, or account number and greeting the employee on a display or by changing the indicator 115, recognizing the age of a customer and permitting the purchase of age restricted items without an employee approval.

Figure 6:
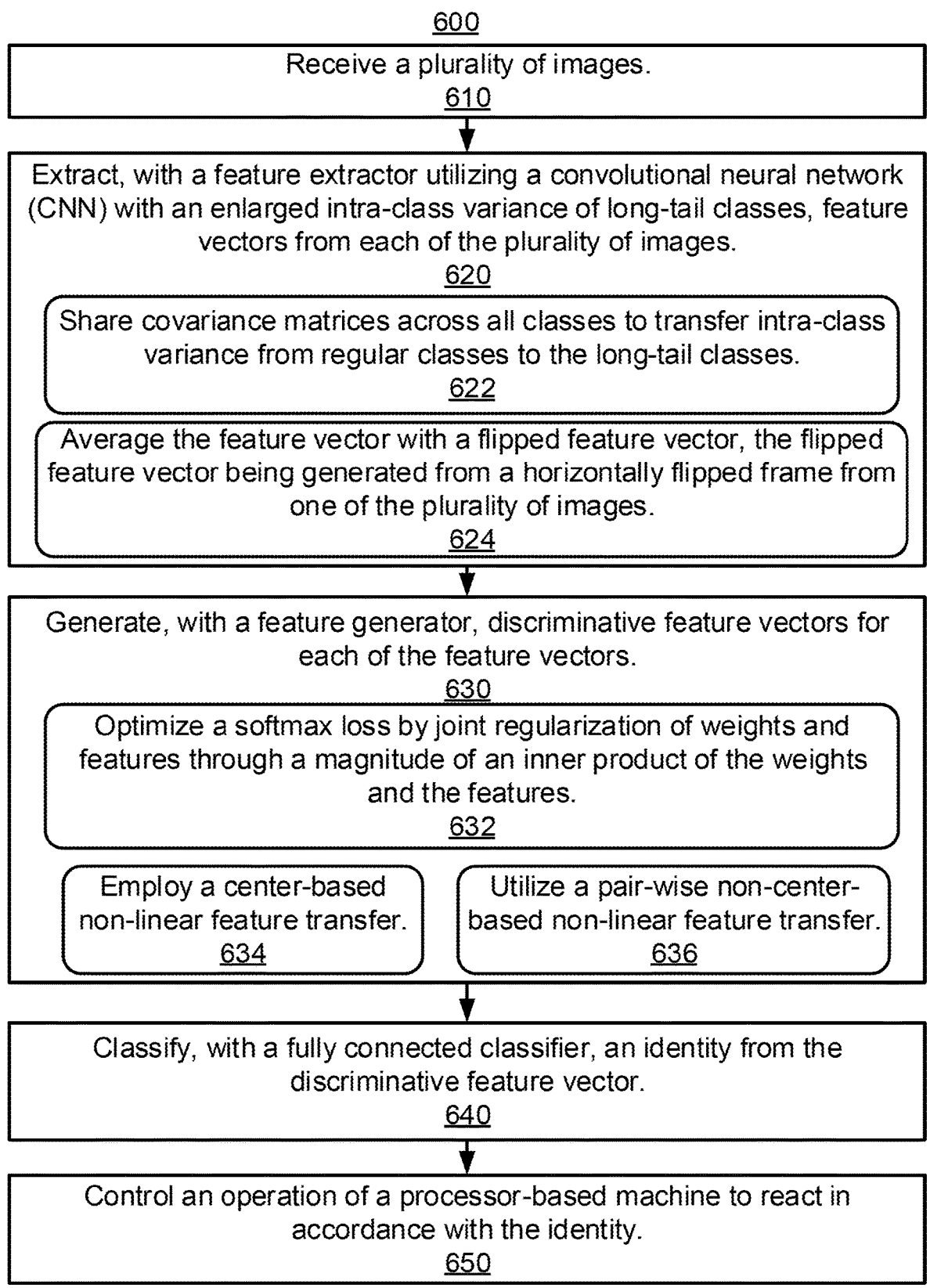
FIG. 6 is a flow diagram illustrating a method for facial recognition, in accordance with an embodiment of the present invention.

Referring to FIG. 6, a flow chart for a facial recognition method 600 is illustratively shown, in accordance with an embodiment of the present invention. In block 610, a plurality of images is received. In block 620, a feature extractor, utilizing a convolutional neural network (CNN) with an enlarged intra-class variance of long-tail classes, extracts feature vectors from each of the plurality of images. In block 622, covariance matrices are shared across all classes to transfer intra-class variance from regular classes to the long-tail classes. In block 624, the feature vector is averaged with a flipped feature vector. The flipped feature vector is generated from a horizontally flipped frame from one of the plurality of images. In block 630, a feature generator generates discriminative feature vectors for each of the feature vectors. In block 632, a softmax loss is optimized by joint regularization of weights and features through a magnitude of an inner product of the weights and the features. In block 634, a center-based non-linear feature transfer is employed. In block 636, a pair-wise non-center-based non-linear feature transfer is utilized. In block 640, a fully connected classifier classifies an identity from the discriminative feature vector. In block 650, operation of a processor-based machine is controlled to react in accordance with the identity.

Figure 7:
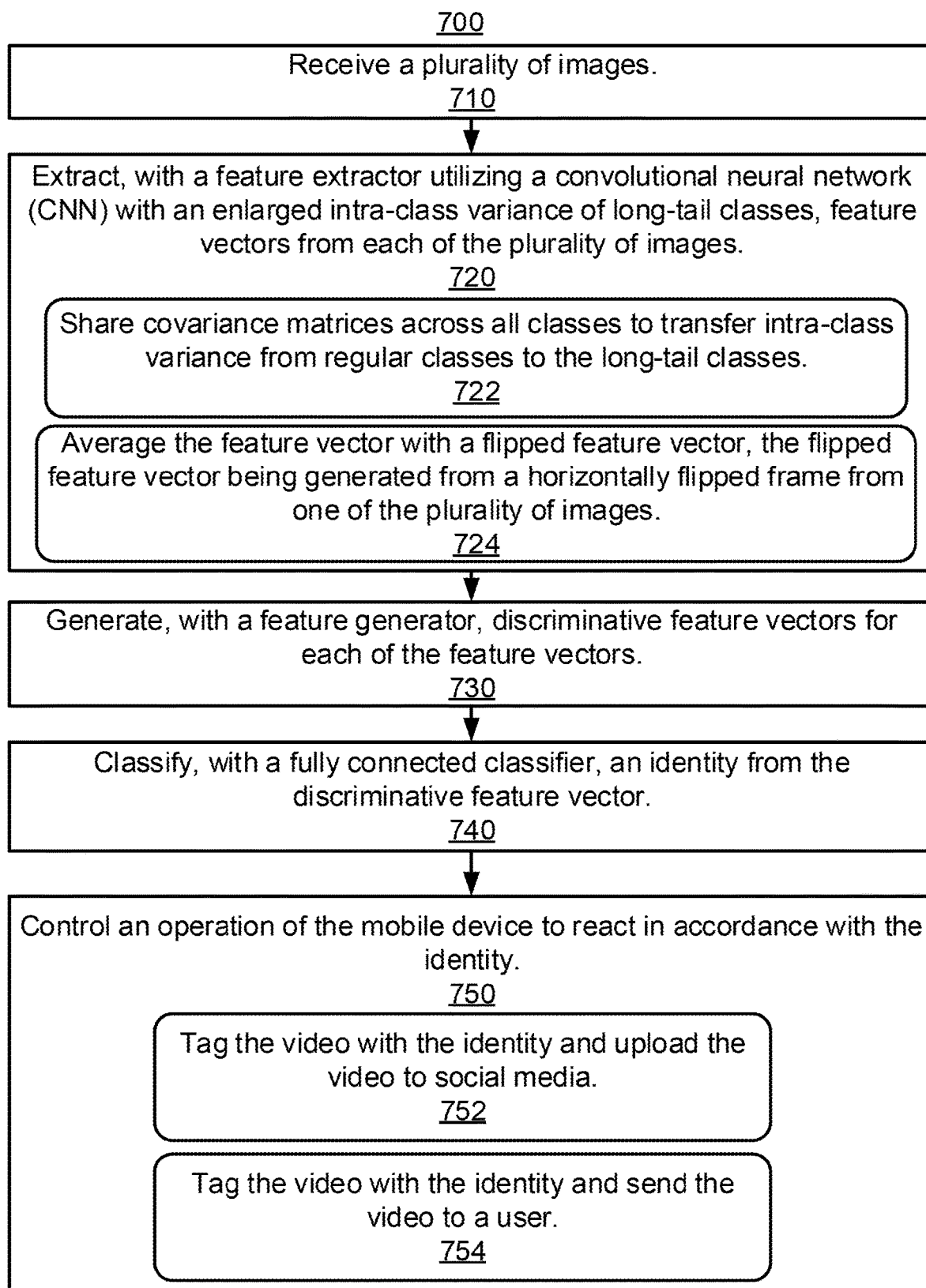
FIG. 7 is a flow diagram illustrating a method for facial recognition in a mobile device, in accordance with an embodiment of the present invention.

Referring to FIG. 7, a flow chart for a facial recognition method 700 in a mobile device is illustratively shown, in accordance with an embodiment of the present invention. In block 710, a plurality of images is received. In block 720, a feature extractor, utilizing a convolutional neural network (CNN) with an enlarged intra-class variance of long-tail classes, extracts feature vectors from each of the plurality of images. In block 722, covariance matrices are shared across all classes to transfer intra-class variance from regular classes to the long-tail classes. In block 724, the feature vector is averaged with a flipped feature vector. The flipped feature vector is generated from a horizontally flipped frame from one of the plurality of images. In block 730, a feature generator generates discriminative feature vectors for each of the feature vectors. In block 740, a fully connected classifier classifies an identity from the discriminative feature vector. In block 750, operation of a processor-based machine is controlled to react in accordance with the identity. In block 752, the video with the identity is tagged and uploaded to social media. In block 754, the video with the identity is tagged and sent to a user.

Figure 8:
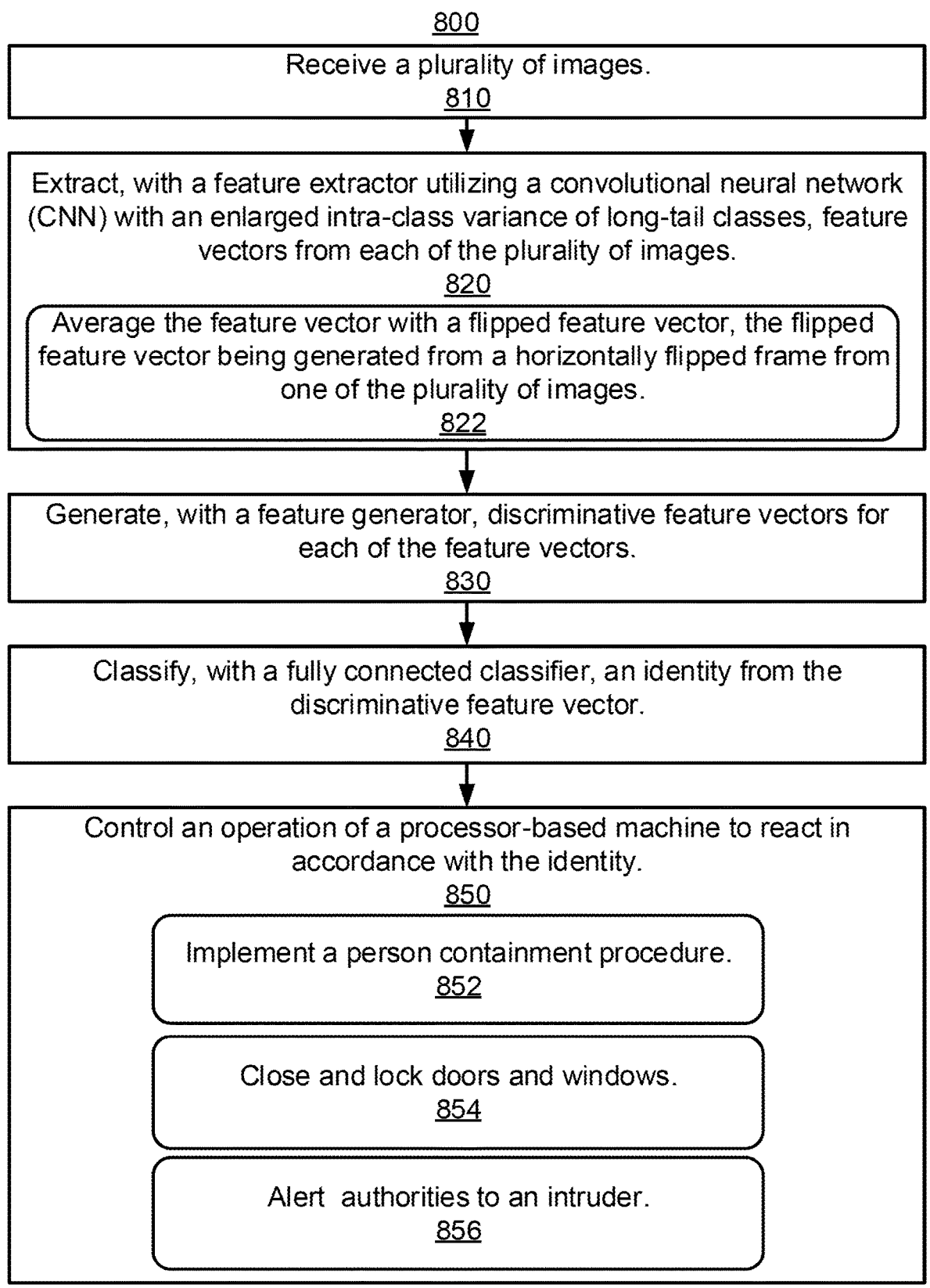
FIG. 8 is a flow diagram illustrating a method for facial recognition in a surveillance system, in accordance with an embodiment of the present invention.

Referring to FIG. 8, a flow chart for a facial recognition method 800 in a surveillance system is illustratively shown, in accordance with an embodiment of the present invention. In block 810, a plurality of images is received. In block 820, a feature extractor, utilizing a convolutional neural network (CNN) with an enlarged intra-class variance of long-tail classes, extracts feature vectors from each of the plurality of images. In block 822, the feature vector is averaged with a flipped feature vector. The flipped feature vector is generated from a horizontally flipped frame from one of the plurality of images. In block 830, a feature generator generates discriminative feature vectors for each of the feature vectors. In block 840, a fully connected classifier classifies an identity from the discriminative feature vector. In block 850, operation of a processor-based machine is controlled to react in accordance with the identity. In block 852, a person containment procedure is implemented. In block 854, doors and windows are closed and locked. In block 856, authorities are alerted to an intruder.

Figure 9:
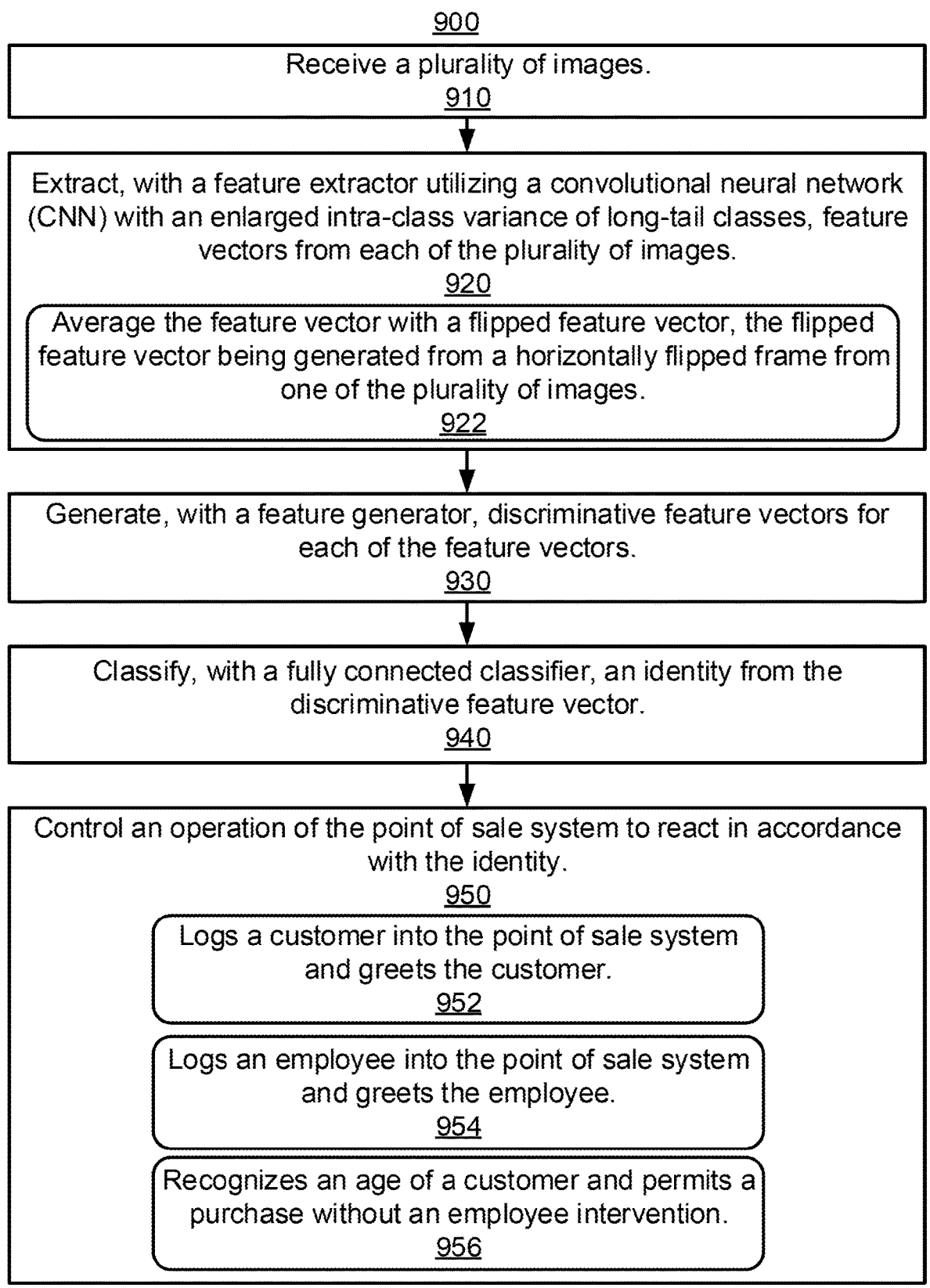
FIG. 9 is a flow diagram illustrating a method for facial recognition in a point of sale system, in accordance with an embodiment of the present invention.

Referring to FIG. 9, a flow chart for a facial recognition method 900 in a point of sale system is illustratively shown, in accordance with an embodiment of the present invention. In block 910, a plurality of images is received. In block 920, a feature extractor, utilizing a convolutional neural network (CNN) with an enlarged intra-class variance of long-tail classes, extracts feature vectors from each of the plurality of images. In block 922, the feature vector is averaged with a flipped feature vector. The flipped feature vector is generated from a horizontally flipped frame from one of the plurality of images. In block 930, a feature generator generates discriminative feature vectors for each of the feature vectors. In block 940, a fully connected classifier classifies an identity from the discriminative feature vector. In block 950, operation of a processor-based machine is controlled to react in accordance with the identity. In block 952, a customer is logged into the point of sale system and greeted. In block 954, an employee is logged into the point of sale system and greeted. In block 956, a customer is recognized and permitted to complete a purchase without an employee intervention.

Embodiments described herein may be entirely hardware, entirely software or including both hardware and software elements. In a preferred embodiment, the present invention is implemented in software, which includes but is not limited to firmware, resident software, microcode, etc.

Figure 10:
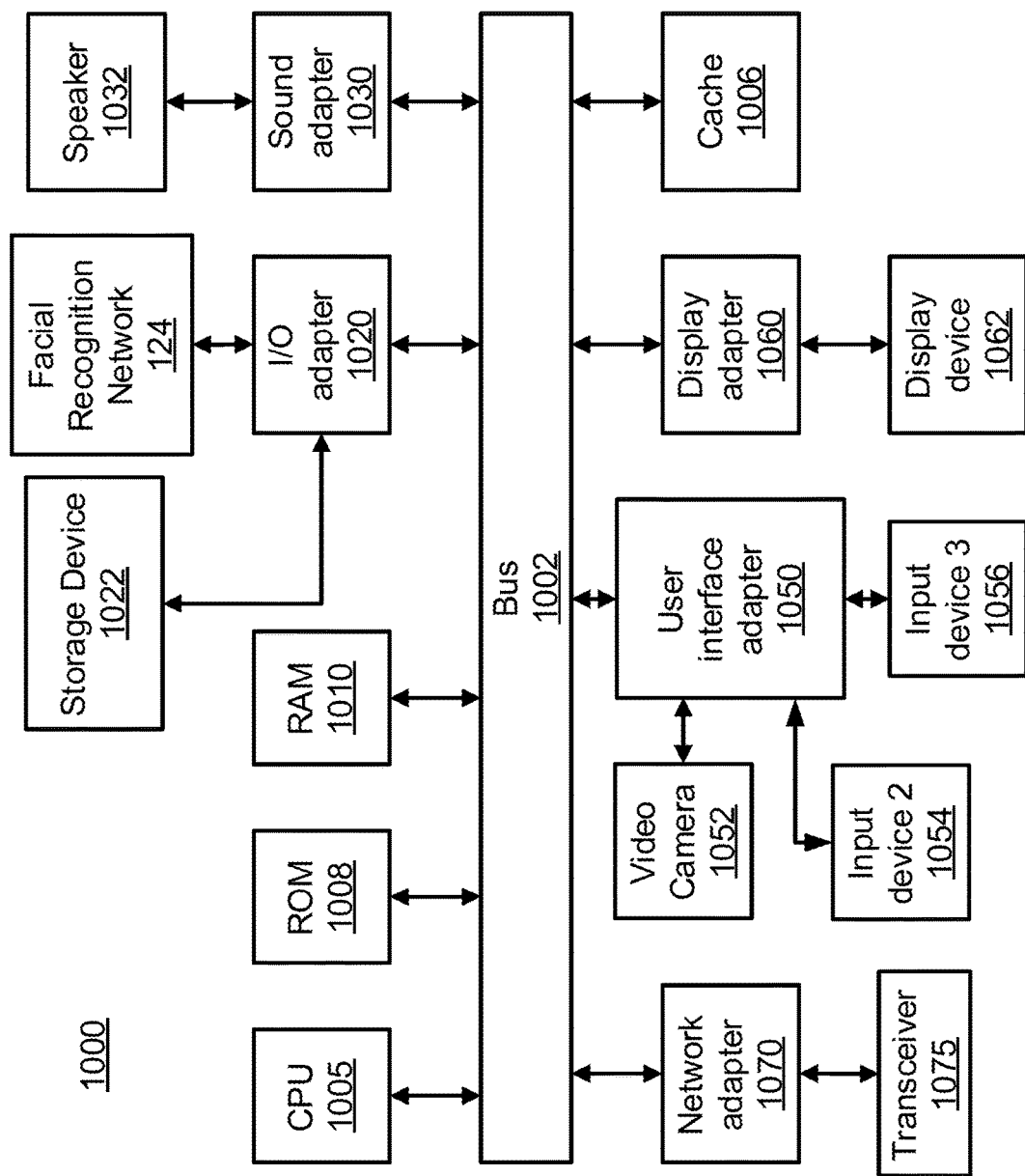
FIG. 10 is a block diagram illustrating a computer processing system, in accordance with an embodiment of the present invention.

Referring to FIG. 10, an exemplary computer system 1000 is shown which may represent a server or a network device, in accordance with an embodiment of the present invention. The computer system 1000 includes at least one processor (CPU) 1005 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1070, a user interface adapter 1050, and a display adapter 1060, are operatively coupled to the system bus 1002.

A storage device 1022 and the facial recognition network 124 are operatively coupled to system bus 1002 by the I/O adapter 1020. The storage device 1022 can be any of a disk storage device (e.g., a magnetic or optical disk storage device), a solid state magnetic device, and so forth.

A speaker 1032 may be operatively coupled to system bus 1002 by the sound adapter 1030. A transceiver 1075 is operatively coupled to system bus 1002 by network adapter 1070. A display device 1062 is operatively coupled to system bus 1002 by display adapter 1060.

A first user input device 1052, a second user input device 1054, and a third user input device 1056 are operatively coupled to system bus 1002 by user interface adapter 1050. The user input devices 1052, 1054, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1052, 1054, and 1056 can be the same type of user input device or different types of user input devices. The user input devices 1052, 1054, and 1056 are used to input and output information to and from system 1000.

Of course, the computer system 1000 may also include other elements (not shown), as readily contemplated by one of skill in the art, as well as omit certain elements. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, it is to be appreciated that environment 100 described above with respect to FIG. 1 is an environment for implementing respective embodiments of the present invention. Part or all of processing system 1000 may be implemented in one or more of the elements of environment 100.

Further, it is to be appreciated that processing system 1000 may perform at least part of the method described herein including, for example, at least part of the facial recognition system 120 of FIG. 1 and/or at least part of method 200 of FIG. 2 and/or at least part of the facial recognition system 120 of FIG. 3 and/or at least part of the facial recognition system 120 of FIG. 4 and/or at least part of the facial recognition system 120 of FIG. 5 and/or at least part of method 600 of FIG. 6 and/or at least part of method 700 of FIG. 7 and/or at least part of method 800 of FIG. 8 and/or at least part of method 900 of FIG. 9.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for facial recognition, the method comprising:
   receiving, by a processor device, a plurality of images;
   extracting, by the processor device with a feature extractor utilizing a convolutional neural network (CNN) with an enlarged intra-class variance of long-tail classes, feature vectors for each of the plurality of images;
   generating, by the processor device with a feature generator, discriminative feature vectors for each of the feature vectors;
   classifying, by the processor device utilizing a fully connected classifier, an identity from the discriminative feature vector; and
   controlling an operation of a processor-based machine to react in accordance with the identity.

2. The computer-implemented method as recited in claim 1, further comprising employing an alternative bi-stage strategy to train the feature extractor, the feature generator, and the fully connected classifier.

3. The computer-implemented method as recited in claim 1, wherein generating includes employing a center-based non-linear feature transfer.

4. The computer-implemented method as recited in claim 1, wherein generating includes utilizing a pair-wise non-center-based non-linear feature transfer.

5. The computer-implemented method as recited in claim 1, wherein extracting includes utilizing a pixel-wise reconstruction loss.

6. The computer-implemented method as recited in claim 1, wherein extracting includes sharing covariance matrices across all classes to transfer intra-class variance from regular classes to the long-tail classes.

7. The computer-implemented method as recited in claim 1, wherein generating includes optimizing a softmax loss by joint regularization of weights and features through a magnitude of an inner product of the weights and features.

8. The computer-implemented method as recited in claim 1, wherein extracting includes averaging the feature vector with a flipped feature vector, the flipped feature vector being generated from a horizontally flipped frame from one of the plurality of images.

9. The computer-implemented method as recited in claim 1, wherein each of the plurality of images is selected from the group consisting of an image, a video, and a frame from the video.

10. The computer-implemented method as recited in claim 2, wherein one stage of the alternative bi-stage strategy includes fixing the feature extractor and applying the feature generator to generate new transferred features that are more diverse and violate a decision boundary.

11. The computer-implemented method as recited in claim 2, wherein one stage of the alternative bi-stage strategy includes fixing the fully connected classifier and updating the feature extractor and the feature generator.

12. A computer program product for facial recognition, the computer program product comprising a non-transitory computer readable storage medium having program instructions embodied therewith, the program instructions executable by a computer to cause the computer to perform a method comprising:
receiving, by a processor device, a plurality of images;
extracting, by the processor device with a feature extractor utilizing a convolutional neural network (CNN) with an enlarged intra-class variance of long-tail classes, feature vectors for each of the plurality of images;
generating, by the processor device with a feature generator, discriminative feature vectors for each of the feature vectors;
classifying, by the processor device utilizing a fully connected classifier, an identity from the discriminative feature vector; and
controlling an operation of a processor-based machine to react in accordance with the identity.

13. A facial recognition system, comprising:
a camera;
a processing system including a processor device and memory receiving input from the camera, the processing system programmed to:
receive a plurality of images;
extract, with a feature extractor utilizing a convolutional neural network (CNN) with an enlarged intra-class variance of long-tail classes, feature vectors from each of the plurality of images;
generate, with a feature generator, discriminative feature vectors for each of the feature vectors;
classify, with a fully connected classifier, an identity from the discriminative feature vectors.

14. The facial recognition system as recited in claim 13, further programmed to train the feature extractor, the feature generator, and the fully connected classifier with an alternative bi-stage strategy.

15. The facial recognition system as recited in claim 13, wherein the feature extractor shares covariance matrices across all classes to transfer intra-class variance from regular classes to the long-tail classes.

16. The facial recognition system as recited in claim 13, wherein the feature generator optimizes a softmax loss by joint regularization of weights and features through a magnitude of an inner product of the weights and features.

17. The facial recognition system as recited in claim 13, wherein the feature extractor averages the feature vector with a flipped feature vector, the flipped feature vector being generated from a horizontally flipped frame from one of the plurality of images.

18. The system as recited in claim 13, further programmed to control an operation of a processor-based machine to react in accordance with the identity.

19. The facial recognition system as recited in claim 14, wherein one stage of the alternative bi-stage strategy fixes the feature extractor and applies the feature generator to generate new transferred features that are more diverse and violate a decision boundary.

20. The facial recognition system as recited in claim 14, wherein one stage of the alternative bi-stage strategy fixes the fully connected classifier and updates the feature extractor and the feature generator.

* * * * *